May 18, 1937. L. H. SPONSELLER 2,080,675
TRACTION DEVICE
Filed April 2, 1936

INVENTOR.
Leo H. Sponseller
BY
Louis C. Vanderlip.
ATTORNEYS.

Patented May 18, 1937

2,080,675

UNITED STATES PATENT OFFICE 2,080,675

TRACTION DEVICE

Leo H. Sponseller, Goshen, Ind.

Application April 2, 1936, Serial No. 72,225

1 Claim. (Cl. 301—44)

This invention relates to power tractors, particularly to the ground gripping structure mounted upon the tractor wheels.

The principal object of the invention is to provide an improved reinforced soft rubber traction device, or lug, for power tractor wheels which not only will not injure the road surface, but which will gain a firm grip in soft ground.

Another object is to provide an improved reinforced soft rubber traction device, or lug, in which the reinforcing element is a metal plate provided with a plurality of holes which are traversed by the soft rubber, and wherein the reinforcing plate is embedded in the soft rubber body of the traction lug intermediate the top and bottom thereof.

Other and more specific objects of the invention are mentioned and described herein.

The invention is illustrated in the accompanying drawing, wherein.

Similar numerals of reference indicate like parts throughout the several views on the drawing.

Figure 1:
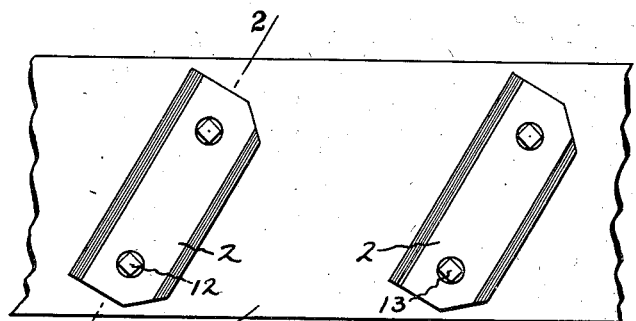
Figure 1 illustrates a top plan view of a fragment of a power tractor wheel rim showing two of my improved traction lugs applied thereto.
Figure 2:
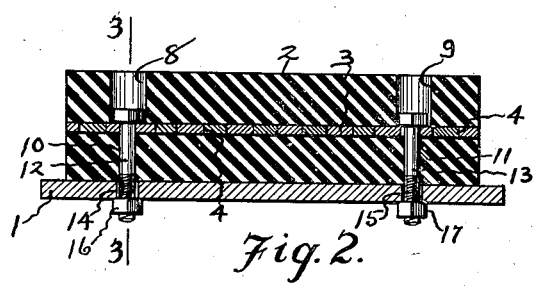
Figure 2 is a section taken on line 2—2 of Figure 1, somewhat enlarged.
Figure 3:
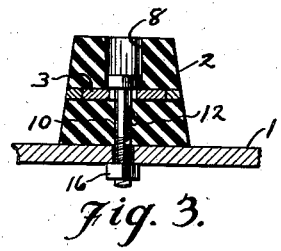
Figure 3 is a section taken on line 3—3 of Figure 2.
Figure 4:
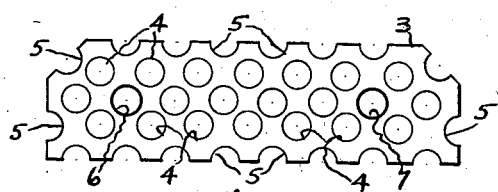
Figure 4 illustrates a plan view of the traction lug reinforcing plate alone.

Referring to the details of the drawing the numeral 1 indicates a fragment, or segment, of a tractor wheel rim to which my improved reinforced rubber traction device, or lug, 2 is diagonally fastened at any desirable angle relatively to the opposed marginal edges of said wheel rim, as hereinafter described. My improved traction device, or lug, comprises the soft rubber body 2 which has the single one piece metal reinforcing plate 3 embedded, or moulded, therein intermediate the top and bottom thereof, said reinforcing plate being provided with a relatively large number of holes 4 formed therein. The holes 4 may be arranged in three rows, or series, extending longitudinally of the plate 3, of which hole series those of the middle row are preferably staggered in relation to the two outer rows of holes. Preferably, the metal plate 3 occupies the major portion of the rubber block, in fact, almost all of it, to effect the maximum degree of reinforcement of the block 2.

The numeral 5 indicates a plurality of arcuate recesses which may be formed in the marginal edges of both sides and ends of the plate 3 which is also provided with a pair of bolt holes 6 and 7, the latter registering with the bolt holes 8 and 9, respectively, formed in the rubber body 2 above the plate 3. The rubber body 2 is provided also with a pair of bolt holes 10 and 11 below the plate 3 and which register and communicate with the plate holes 6 and 7, respectively, and the body holes 8 and 9, respectively.

The numerals 12 and 13 indicate a pair of fastener bolts which traverse the bolt holes 6 and 7 of the plate 3 and holes 10 and 11 of the rubber body 2, the lower end of said bolts passing through the wheel rim holes 14 and 15 and having nuts 16 and 17 thereon, the heads of said bolts engaging the face of the reinforcing plate about the bolt holes 6 and 7 and within the holes 8 and 9 of the soft rubber body 2.

The plate 3 may be electro-plated to facilitate the tenacity with which the rubber lug body adheres to the plate 3. In the construction of my improved traction device, or lug, the soft rubber will flow through the plate holes 4 and the recesses 5, whereby the upper and lower portions of the rubber body are securely knitted or tied together through said holes and recesses.

I claim:

A traction device of the character described comprising a soft rubber body, and a single metal reinforcing plate embedded in said rubber body intermediate the top and bottom thereof, said reinforcing plate being provided with a plurality of holes and a plurality of marginal edge recesses through which the soft rubber extends to knit the upper and lower portions of said rubber body together, and said rubber body and reinforcing plate being provided with a plurality of registering bolt holes.

LEO H. SPONSELLER.